May 1, 1934.   H. W. PLEISTER   1,956,623
SPRING TOGGLE
Filed April 14, 1932
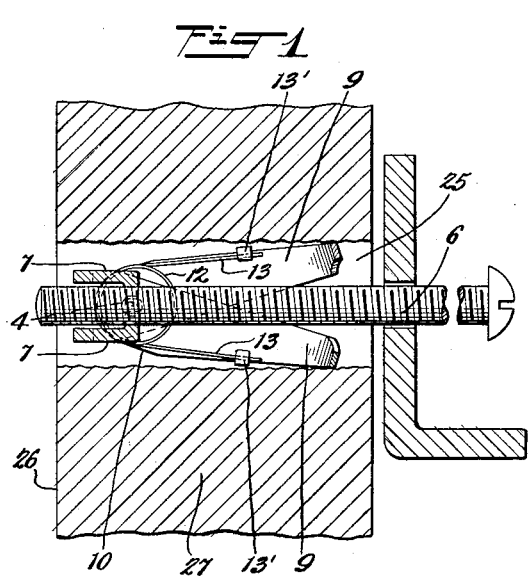
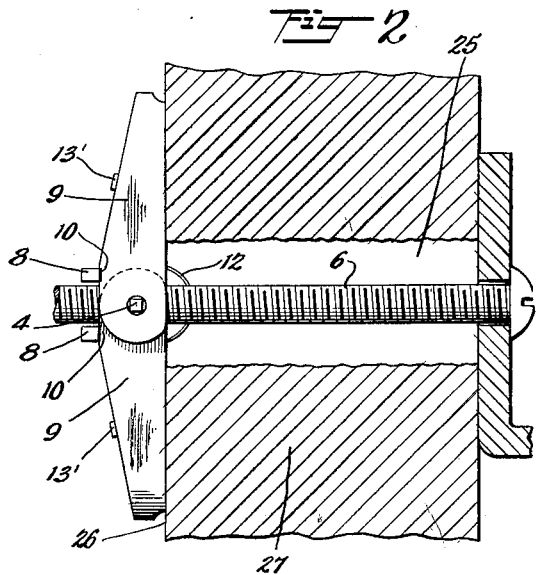
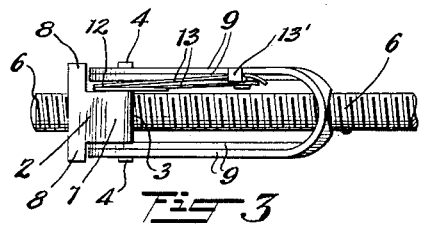
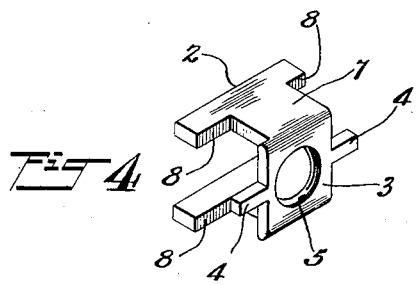
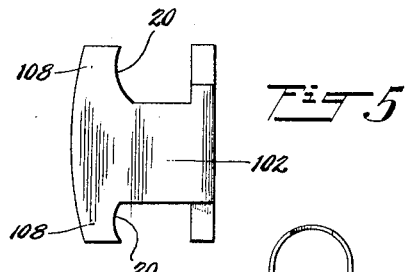
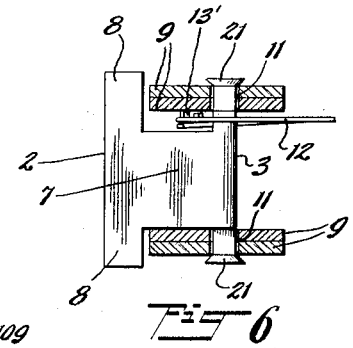
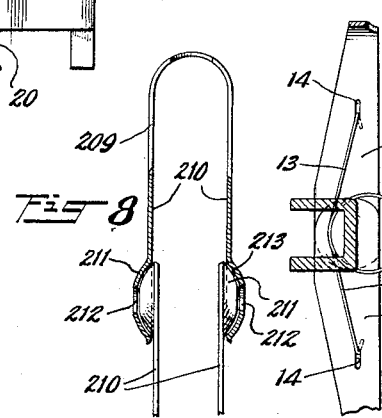
INVENTOR
Henry W. Pleister.
BY
ATTORNEY Patented May 1, 1934

1,956,623

UNITED STATES PATENT OFFICE 1,956,623

SPRING TOGGLE

Henry W. Pleister, Westfield, N. J., assignor to Henry B. Newhall Corporation, Garwood, N. J., a corporation of New Jersey Application April 14, 1932, Serial No. 605,279

2 Claims. (Cl. 85—3)

My invention relates to a new and improved spring toggle, to secure objects to walls, ceilings, or other supports, where it is impossible, or not feasible, to get behind the support to manually apply a nut, or other fastening member, to the bolt supporting the work.

My invention further relates to certain combinations, sub-combinations, and articles of manufacture as will be more fully hereinafter described and pointed out in the claims.

In the accompanying drawing I have shown different illustrative embodiments of my invention, simply by ways of example, though it is to be distinctly understood that my invention is not to be confined to these particular forms. In this drawing the same reference numerals refer to similar parts in the several figures.

Fig. 1 is a vertical section through a wall or other support, and the work supported, showing my spring toggle being placed in position:

Fig. 2 is a vertical section, similar to Fig. 1, illustrating the wings extended and the work supported against the face of the support:

Fig. 3 is a plan view of the preferred form of my spring toggle, with the wings depressed and the resilient means under tension, about to be located in a hole:

Fig. 4 is an enlarged detailed perspective view of one form of my wing supporting member:

Fig. 5 is a side elevation of a modified form of my wing supporting member:

Fig. 6 is a detail view of a modified form of wing supporting member in which the ends of the trunnions, or pivots, are upset to more securely hold the wings which are shown in section:

Fig. 7 is a detail sectional view of a modification in which the ends of the resilient member are slidably engaged in slots in the spring wings.

Fig. 8 is a detail of the preferred form of wings equipped with struck up portions to form cooperating circular convex and concave pivoting bosses.

It has been found in practice that the point of failure in most toggle bolts is at the trunnions or pivots. This is because the load is applied at those two points only and the failure is caused either by the trunnions bending or breaking and allowing the load to fall, or by the crushing of the wings of the toggle due to the application of the load at these two concentrated points.

When a toggle fails and lets the work fall, there is always more or less damage to the work and to other objects in its path. When the work is heavy and workmen or pedestrians normally pass under it, there is liability of seriously injuring them, with the resulting law suits for personal injuries, or compensation under workmen's liability laws.

My toggle bolt, for any given load, is a much stronger one than any previously in use, in that the tension strain of the load, applied by the stove or other bolt, is transmitted to the wings at a plurality of points, including the two trunnions or pivots, thereby relieving the trunnions of the maximum strain, and insuring that the toggle bolt will not fail.

For purposes of illustration I have shown the tension strain distributed over six points, namely the two trunnions or pivots and four compression stops on the wing supporting member. These, however, are merely illustrative, as the number of these points may be varied to accomplish the same purpose. My spring toggle is also one that can be manufactured at minimum expense.

In the particular embodiment of my invention shown in Figures 1 to 4 inclusive, my toggle bolt comprises a wing supporting member 2 preferably stamped from sheet metal having a body 3, integral trunnions or pivots 4, 4, a screw threaded aperture 5 to cooperate with a stove or other bolt 6, and two arms 7, 7, bent substantially at right angles to the body 3. These arms 7, 7 are cut away to form four compression stops 8, 8 adapted to engage with and take the major tension strains thrown upon the steel or other pivoted wings 9, 9. Preferably, though not necessarily, the edges of the wings 9, 9 are flattened or straightened at 10, 10 to engage with the compression stops 8, 8, see Fig. 2.

The wings 9, 9 may be variously formed but are preferably steel stampings bent back on themselves to form U-shaped wings, each wing being provided with two pivoting holes 11, 11 to receive the integral trunnions 4, 4 on the wing supporting member 2.

I employ a resilient member, mounted in any suitable manner, to cause the wings 9, 9 to spring out into their operative position, as shown in Fig. 2. By way of example this resilient member may be a coil spring 12 having its two arms 13, 13 cooperating with the wings 9, 9 to actuate them in one direction. In Figures 1, 2 and 3 the wings are provided with integral lugs 13', 13' to cooperate with the ends of the coil spring 12.

In the modification shown in Fig. 7, the ends of the coil spring are bent and slide in elongated slots 14, 14 in the wings 109, 109, of that modification, which is the same in all respects as that previously described, except in this particular.

There are various ways in which the ends of the spiral spring may be attached to the wings and it is not my desire to limit this patent to any particular means of fastening the ends of the springs to the wings.

In some cases to assist in holding the two sides of the wings 9, 9 from slipping off the trunnions or pivots, I may undercut the compression stops, as shown in the modification Fig. 5, wherein the compression stops 108, 108 of the wing supporting member 102, are undercut at 20.

In some cases I may upset the ends of the trunnions as shown at 21, 21, Fig. 6, to more firmly secure the wings on the trunnions.

In Fig. 8, I have shown my preferred form of wings 209, 209, bent from flat sheet steel, each wing having two arms, 210, 210. The ends of these arms 210, 210 are provided with circular raised bosses 211, 211, each circular boss being provided with a registering hole 212, for the reception of the integral, or other pivot, 4, of the wing supporting member 2.

The bosses are preferably formed by striking them up to form the circular convex portion 211 on one side of the arms 210, and at the same time concave circular bearings or bosses 213, on the other side of the same boss. This permits the convex portion of one wing to fit into the concave portion of the cooperating wing and yet permits the wings to have a pivoted movement with relation to each other.

The wings 209, 209 are assembled together by simply causing the convex portion of the two bosses on one wing to spring into the concave bearings or bosses on the other wing, as shown in Fig. 8. The spring of the sheet metal is sufficient to hold them together.

It has been found in practice that wings thus equipped with dished or circular bosses, as shown in Fig. 8, each hold the other or cooperating wing more rigidly in alignment, and insure their remaining concentric with the hole, thus preventing rattling of the wings with each other, and with the pivots.

Wings equipped with these circular bosses lessen the diameter of the hole which has to be drilled, or otherwise formed, to receive them, so that a neater job is performed; and, as the hole is smaller, there is less material to be removed in drilling, resulting in a material saving in the cost of installation.

It will be noted that in all forms the compression stops engage with the edges of the wings which will also assist in preventing their collapse or failure.

It will also be noted that the wings do not directly engage with the threads of the stove or other bolt, so that the screwing up of the stove bolt is not resisted and made more difficult by the friction of the wings directly engaging with the threads of the bolt.

The toggle bolt is located in the hole 25 by the operator moving the wings into the position illustrated in Fig. 3, by compressing the wings, usually by his thumb and forefinger. This places the resilient member or spring under tension which is relieved as soon as the ends of the wings pass the rear surface 26 of the wall 27 when they fly out. By then screwing up the bolt 6 the wings engage the rear surface 26 of the wall, see Fig. 2.

Having thus described this invention in connection with illustrative embodiments thereof, to the details of which I do not desire to be limited, what is claimed as new and what is desired to secure by Letters Patent is set forth in the appended claims.

What I claim is:

1. In a toggle bolt the combination of wings provided with cooperating convex and concave circular pivoting bosses to permit the wings to pivot on each other, said bosses being provided with registering apertures, a wing supporting member provided with pivots adapted to cooperate with the apertures of the circular bosses on the wings, means to extend the wings, and means to clamp the toggle to a wall or other support.

2. In a toggle bolt the combination of pivoted wings and a single rigid nut provided with parallel arms each arm being provided with rigid compression stops, said nut being provided with trunnions said trunnions being located in a plane in advance of the rigid compression stops, said wings being mounted on the trunnions, their pivoted movement thereon being limited by the compression stops to transfer a large portion of the tension strains of the load to the wings at points other than the trunnions, to prevent failure of the toggle bolt.

HENRY W. PLEISTER.